(12) United States Patent
Dai et al.

(10) Patent No.: US 9,760,169 B2
(45) Date of Patent: Sep. 12, 2017

(54) LINE-OF-SIGHT PROCESSING METHOD, LINE-OF-SIGHT PROCESSING SYSTEM AND WEARABLE DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Weinan Dai, Beijing (CN); Fujiang Jin, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

(*) Notice: Subject to any disclaimer, the term of this patent is extended or adjusted under 35 U.S.C. 154(b) by 12 days.

(21) Appl. No.: 14/740,861

(22) Filed: Jun. 16, 2015

(65) Prior Publication Data
US 2016/0139664 A1 May 19, 2016

(30) Foreign Application Priority Data
Nov. 14, 2014 (CN) .......................... 2014 1 0647528

(51) Int. Cl.
*G06F 3/01* (2006.01)
*G02B 27/00* (2006.01)

(52) U.S. Cl.
CPC ......... *G06F 3/013* (2013.01); *G02B 27/0093* (2013.01); *G06F 3/012* (2013.01)

(58) Field of Classification Search
CPC .................................. G06F 3/012; G06F 3/013
See application file for complete search history.

(56) References Cited

U.S. PATENT DOCUMENTS

| 8,736,692 B1* | 5/2014 | Wong | G06F 3/013 348/208.4 |
| 2002/0101568 A1* | 8/2002 | Eberl | G02B 27/017 351/211 |

(Continued)

FOREIGN PATENT DOCUMENTS

| CN | 1694045 A | 11/2005 |
| CN | 103136519 A | 6/2013 |

(Continued)

OTHER PUBLICATIONS

First Office Action regarding Chinese application No. 201410647528.8, dated Dec. 5, 2016. Translation provided by Dragon Intellectual Property Law Firm.

*Primary Examiner* — Kent Chang
*Assistant Examiner* — William Lu
(74) *Attorney, Agent, or Firm* — Harness, Dickey & Pierce, P.L.C.

(57) ABSTRACT

The present disclosure provides a line-of-sight (LOS) processing method, an LOS processing system and a wearable device. The LOS processing method includes steps of: collecting a head deflection angle and an eyeball deflection angle of a user; determining a position of the user's LOS at a display interface in accordance with the head deflection angle and the eyeball deflection angle of the user; acquiring action information of the user's eyeball; identifying an action command corresponding to the action information of the user's eyeball; and performing a corresponding operation on a display image at the position of the user's LOS in accordance with the identified action command.

8 Claims, 8 Drawing Sheets

(56) References Cited

U.S. PATENT DOCUMENTS

| | | | | |
|---|---|---|---|---|
| 2004/0061831 | A1* | 4/2004 | Aughey | A61B 3/113 351/209 |
| 2009/0189974 | A1* | 7/2009 | Deering | G09G 3/02 348/46 |
| 2011/0069277 | A1* | 3/2011 | Blixt | A61B 3/113 351/210 |
| 2013/0117377 | A1* | 5/2013 | Miller | H04L 67/38 709/205 |
| 2013/0147687 | A1* | 6/2013 | Small | G09G 5/00 345/8 |
| 2013/0208234 | A1* | 8/2013 | Lewis | G06F 3/011 351/158 |
| 2013/0258089 | A1* | 10/2013 | Lyons | H04N 5/23212 348/77 |
| 2014/0043229 | A1* | 2/2014 | Higaki | G06F 3/013 345/156 |
| 2014/0337634 | A1* | 11/2014 | Starner | H04L 9/3231 713/186 |
| 2015/0029087 | A1* | 1/2015 | Klappert | G06F 3/015 345/156 |

FOREIGN PATENT DOCUMENTS

| | | |
|---|---|---|
| CN | 103293673 A | 9/2013 |
| CN | 103870738 A | 6/2014 |
| EP | 2052676 A1 | 4/2009 |

\* cited by examiner

LINE-OF-SIGHT PROCESSING METHOD, LINE-OF-SIGHT PROCESSING SYSTEM AND WEARABLE DEVICE

CROSS-REFERENCE TO RELATED APPLICATION

The present application claims a priority of the Chinese patent application No. 201410647528.8 filed on Nov. 14, 2014, which is incorporated herein by reference in its entirety.

TECHNICAL FIELD

The present disclosure relates to the field of line-of-sight (LOS) detection, in particular to an LOS processing method, an LOS processing system and a wearable device.

BACKGROUND

Recently, an LOS detection technology has attracted more and more attentions. In the field of flat-panel PC, a user expects to select an object on a screen of the flat-panel PC by LOS detection rather than his finger, so as to facilitate the operation thereof. Meanwhile, in the field of smart TV, for the channel switching and a power-off function when it is not in use, the LOS detection has aroused concern as a novel user interface for replacing a remote controller.

Usually, an existing LOS detection technology includes positioning a user's LOS by capturing an eyeball, but it is unable to position the LOS in an excellent manner. This is because the user's LOS may be adversely affected by such factors as a viewing angle and a viewing distance, apart from a deflection angle of the eyeball. Hence, it is impossible for the existing LOS detection technology to position the user's LOS accurately.

SUMMARY

An object of the present disclosure is to provide an LOS processing method, an LOS processing system and a wearable device, so as to accurately position a user's LOS, thereby to facilitate the user's operation on a display image at a position of the LOS.

In one aspect, the present disclosure provides in one embodiment an LOS processing method, including:

a collecting step of collecting a head deflection angle and an eyeball deflection angle of a user; and a positioning step of determining a position of the user's LOS at a display interface in accordance with the head deflection angle and the eyeball deflection angle of the user.

Further, the collecting step includes:

detecting the head deflection angle of the user using a microelectronic mechanical gyroscope located at the user's head, so as to acquire the head deflection angle of the user; and collecting an image of a user's eyeball using an image collector, so as to determine a junction between an iris and a sclera of the user's eyeball, thereby to calculate the eyeball deflection angle of the user.

Further, the collecting step includes:

when the image is collected by the image collector, supplementing light for the image collector using an infrared lighting module.

Further, prior to the collecting step, the method includes:

a setting step of setting an LOS reference point of the user, and when the user fixes his eyes on the LOS reference point, acquiring initial LOS data of the user.

Further, the initial LOS data includes an initial junction between the iris and the sclera of the user's eyeball, and the collecting step includes:

comparing the junction between the iris and the sclera of the user's eyeball with the initial junction, so as to calculate the eyeball deflection angle of the user.

Further, subsequent to the positioning step, the method includes:

an acquiring step of acquiring action information of the user's eyeball;

an identifying step of identifying an action command corresponding to the action information of the user's eyeball; and a processing step of performing a corresponding operation on a display image at the position of the user's LOS in accordance with the identified action command.

Further, the collecting step, the positioning step, the acquiring step and the identifying step are performed by a wearable device, and the processing step is performed by a terminal device. Between the identifying step and the processing step, the method further includes transmitting, by the wearable device, the identified action command and the position of the user's LOS to the terminal device.

In another aspect, the present disclosure provides in one embodiment an LOS processing system, including:

a collecting module configured to collect a head deflection angle and an eyeball deflection angle of a user; and a positioning module configured to determine a position of the user's LOS at a display interface in accordance with the head deflection angle and the eyeball deflection angle of the user.

Further, the collecting module includes:

a first collecting unit configured to detect the head deflection angle of the user using a microelectronic mechanical gyroscope located at a user's head, so as to acquire the head deflection angle of the user; and a second collecting unit configured to collect an image of a user's eyeball using an image collector, so as to determine a junction between an iris and a sclera of the user's eyeball, thereby to calculate the eyeball deflection angle of the user.

Further, the system includes:

a setting module configured to set an LOS reference point of the user, and when the user fixes his eyes on the LOS reference point, acquiring initial LOS data of the user.

Further, the initial LOS data includes an initial junction between the iris and the sclera of the user's eyeball, and the second collecting unit is configured to compare the junction between the iris and the sclera of the user's eyeball with the initial junction, so as to calculate the eyeball deflection angle of the user.

Further, the system includes:

an acquiring module configured to acquire action information of the user's eyeball;

an identifying module configured to identify an action command corresponding to the action information of the user's eyeball; and a processing module configured to perform a corresponding operation on a display image at the position of the user's LOS in accordance with the identified action command.

Further, the collecting module, the positioning module, the acquiring module and the identifying module are arranged in a wearable device, and the processing module is arranged in a terminal device. The wearable device further includes a primary communication module, and the terminal device further includes a secondary communication module and a display module. The primary communication module is configured to transmit the identified action command and the position of the user's LOS to the secondary communication module. The secondary communication module is configured to receive the identified action command and the position of the user's LOS from the primary communication module. The display module is configured to provide the display interface.

Further, the system includes an infrared lighting module configured to supplement light for the image collector.

In yet another aspect, the present disclosure provides in one embodiment a wearable device, including:

a collecting module configured to collect a head deflection angle and an eyeball deflection angle of a user; and a positioning module configured to determine a position of a user's LOS at a display interface in accordance with the head deflection angle and the eyeball deflection angle of the user.

Further, the wearable device includes:

an acquiring module configured to acquire action information of the user's eyeball;

an identifying module configured to identify an action command corresponding to the action information of the user's eyeball; and a primary communication module configured to transmit the identified action command and the position of the user's LOS to a terminal device.

According to the embodiments of the present disclosure, the head deflection angle and the eyeball deflection angle of the user are collected, respectively, and the user's LOS is positioned in accordance with the head deflection angle and the eyeball deflection angle of the user. As a result, it is able to accurately position the user's LOS, thereby to facilitate the corresponding operations on the display image at the position of the user's LOS.

DETAILED DESCRIPTION

In order to make the objects, the technical solutions and the advantages of the present disclosure more apparent, the present disclosure will be described hereinafter in conjunction with the drawings and embodiments.

First Embodiment

Figure 1:
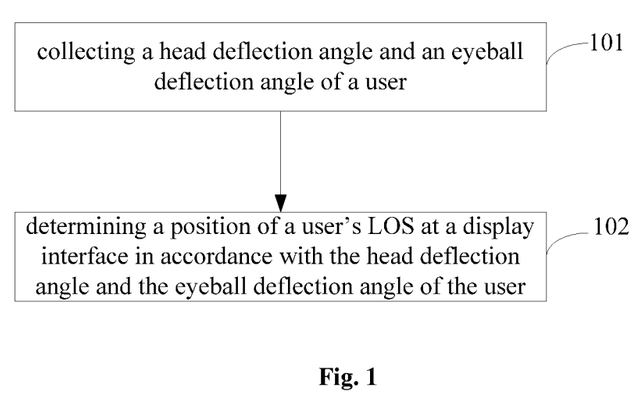
FIG. 1 is a flow chart of an LOS processing method according to the first embodiment of the present disclosure.

As shown in FIG. 1, which is a flow chart of an LOS processing method according to the first embodiment of the present disclosure, the method includes the following steps.

Step 101: collecting a head deflection angle and an eyeball deflection angle of a user.

To be specific, the head deflection angle and the eyeball deflection angle of the user may be collected by a wearable device located at a user's head. The wearable device includes a microelectronic mechanical gyroscope and an image collector, and alternatively the wearable device is a hamlet or glasses. The head deflection angle of the user is detected by the microelectronic mechanical gyroscope so as to acquire the head deflection angle of the user. An image of a user's eyeball is collected by the image collector, e.g., a camera, and the collected image is grayed, so as to determine a junction between an iris and a sclera of the user's eyeball, thereby to calculate the eyeball deflection of the user. Specifically, an LOS reference point of the user may be set in advance, and when the user fixes his eyes on the LOS reference point, initial LOS data of the user is acquired. The initial LOS data includes an initial junction between the iris and the sclera of the user's eyeball. Then, the junction between the iris and the sclera of the user's eyeball is compared with the initial junction, so as to calculate the eyeball deflection angle of the user.

Further, when the image is collected by the image collector, an infrared lighting module may be used to supplement light for the image collector, so as to ensure an identification rate in a dark state.

Step 102: determining a position of a user's LOS at a display interface in accordance with the head deflection angle and the eyeball deflection angle of the user.

To be specific, merely one image is displayed at the display interface of a terminal device, the display image may be divided into n*m regions, and a region where the user's LOS is located may be determined in the display image. When several images are displayed at the display interface of the terminal device, the display image at the position of the user's LOS may be determined.

According to this embodiment, the head deflection angle and the eyeball deflection angle of the user are collected, respectively, and the user's LOS is positioned in accordance with the head deflection angle and the eyeball deflection angle of the user. As a result, it is able to accurately position the user's LOS, thereby to facilitate a corresponding operation on the display image at the position of the user's LOS.

Second Embodiment

Figure 2:
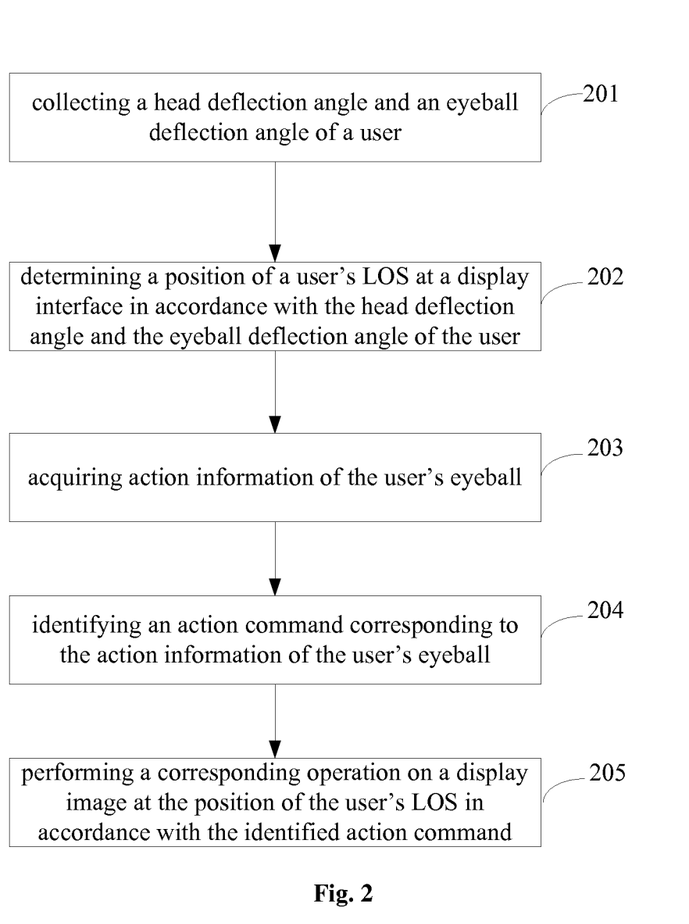
FIG. 2 is another flow chart of the LOS processing method according to the second embodiment of the present disclosure.

On the basis of the first embodiment, a corresponding operation may be performed on the image at the user's LOS in accordance with a positioning result in this embodiment. As shown in FIG. 2, which is another schematic view showing the LOS processing method according to the second embodiment of the present disclosure, the method includes the following steps.

Step 201: collecting a head deflection angle and an eyeball deflection angle of a user.

To be specific, the head deflection angle and the eyeball deflection angle of the user may be collected by a wearable device located at a user's head. The wearable device includes a microelectronic mechanical gyroscope and an image collector, and alternatively the wearable device is a hamlet or glasses. The head deflection angle of the user is detected by the microelectronic mechanical gyroscope so as to acquire the head deflection angle of the user. An image of a user's eyeball is collected by the image collector, e.g., a camera, and the collected image is grayed, so as to determine a junction between an iris and a sclera of the user's eyeball, thereby to calculate the eyeball deflection of the user. Specifically, an LOS reference point of the user may be set in advance, and when the user fixes his eyes on the LOS reference point, initial LOS data of the user is acquired. The initial LOS data includes an initial junction between the iris and the sclera of the user's eyeball. Then, the junction between the iris and the sclera of the user's eyeball is compared with the initial junction, so as to calculate the eyeball deflection angle of the user.

Further, when the image is collected by the image collector, an infrared lighting module may be used to supplement light for the image collector, so as to ensure an identification rate in a dark state.

Step 202: determining a position of a user's LOS at a display interface in accordance with the head deflection angle and the eyeball deflection angle of the user.

To be specific, merely one image is displayed at the display interface of a terminal device, the display image may be divided into n*m regions, and a region where the user's LOS is located may be determined in the display image. When several images are displayed at the display interface of the terminal device, the display image at the position of the user's LOS may be determined.

Step 203: acquiring action information of the user's eyeball.

To be specific, the action information of the user's eyeball may be acquired by the image collector, and the action information of the user's eyeball includes, but not limited to, where or not the user's LOS remains at an identical region for a period of time exceeding a predetermined time, a blinking action of the user, pupil contraction, pupil dilation and a squinting action. When a boundary image of the iris of the user's eyeball cannot be collected by the image collector, it is determined that the user has closed his eyes, and when an area of the iris of the user's eyeball collected by the image color is reduced, it is determined that the user is squinting.

Step 204: identifying an action command corresponding to the action information of the user's eyeball.

To be specific, an action information database may be established in advance, and a correspondence between the action information of the user's eyeball and the action command is stored in the action information database. The action command corresponding to the acquired action information of the user's eyeball may be searched in the action information database. The action information database may be set by a manufacturer, or customized by the user. The action information database may be stored in the terminal device for displaying an image to the user, or in the wearable device worn by the user.

Step 205: performing a corresponding operation on a display image at the position of the user's LOS in accordance with the identified action command.

To be specific, when the user's LOS remains at an identical region for a period of time exceeding the predetermined time, an image at this region is zoomed in, and after the user's LOS is moved away, the image at this region is recovered. During the blinking action, the image at the position of the user's LOS is cancelled; during the pupil contraction or the squinting action, brightness of the image at the user's LOS is reduced; and during the pupil dilation or a wide open of the eye, the brightness of the image at the user's LOS is increased.

For an existing terminal device for providing the display interface, usually the brightness is not modified automatically, let alone with judging a comfort level of the user to the brightness. According to the LOS processing method in this embodiment, it is able to adjust the brightness of the display image in accordance with the comfort level of the user to the brightness, thereby to improve the user experience. In addition, the wearable device may automatically acquire the action information of the user's eyeball without any manual operations, and then the terminal device may automatically perform the corresponding operation on the display image at the position of the user's LOS in accordance with the acquired action information, so it is able to facilitate the user's operation.

Third Embodiment

Figure 3:
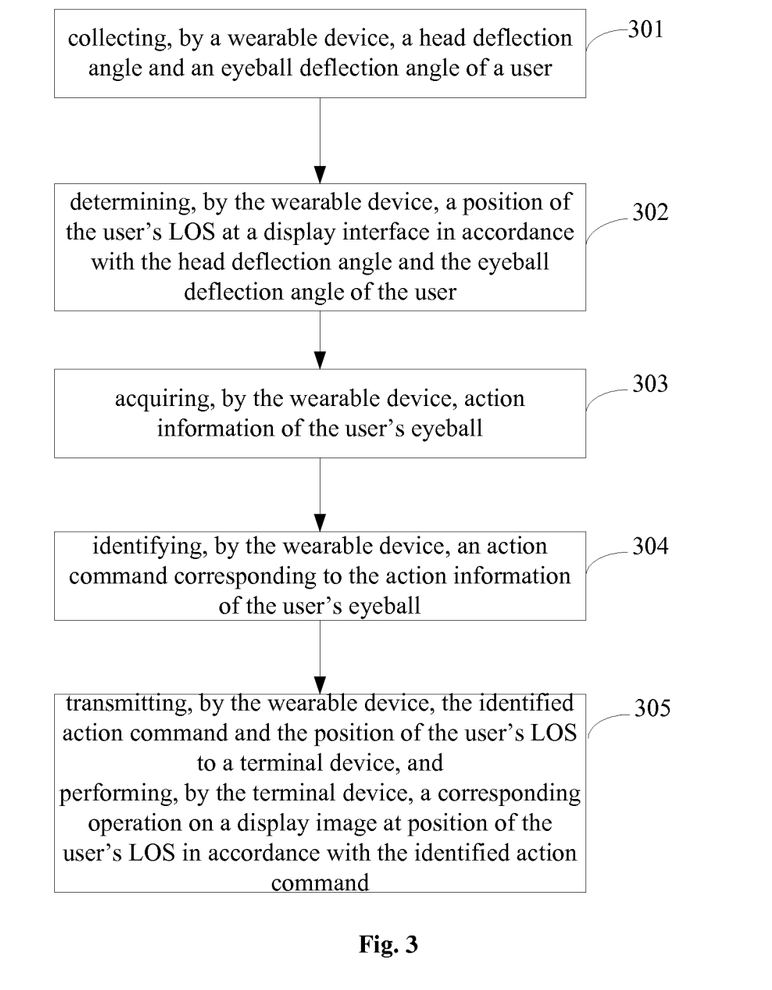
FIG. 3 is yet another flow chart of the LOS processing method according to the third embodiment of the present disclosure.

In this embodiment, the wearable device may be used to detect the position of the user's LOS, acquire the action information of the user's eyeball, identify the action command corresponding to the action information of the user's eyeball, and transmit the identified action command and the position of the user's LOS to the terminal device. As shown in FIG. 3, which is yet another flow chart of the LOS processing method in the third embodiment, the method includes the following steps.

Step 301: collecting, by the wearable device, a head deflection angle and an eyeball deflection angle of a user.

To be specific, the head deflection angle and the eyeball deflection angle of the user may be collected by the wearable device located at a user's head. The wearable device includes a microelectronic mechanical gyroscope and an image collector, and alternatively the wearable device is a hamlet or glasses. The head deflection angle of the user is detected by the microelectronic mechanical gyroscope so as to acquire the head deflection angle of the user. An image of a user's eyeball is collected by the image collector, e.g., a camera, and the collected image is grayed, so as to determine a junction between an iris and a sclera of the user's eyeball, thereby to calculate the eyeball deflection of the user. Specifically, an LOS reference point of the user may be set in advance, and when the user fixes his eyes on the LOS reference point, initial LOS data of the user is acquired. The initial LOS data includes an initial junction between the iris and the sclera of the user's eyeball. Then, the junction between the iris and the sclera of the user's eyeball is compared with the initial junction, so as to calculate the eyeball deflection angle of the user.

Further, when the image is collected by the image collector, an infrared lighting module may be used to supplement light for the image collector, so as to ensure an identification rate in a dark state.

Step 302: determining, by the wearable device, a position of a user's LOS at a display interface in accordance with the head deflection angle and the eyeball deflection angle of the user.

To be specific, merely one image is displayed at the display interface of a terminal device, the display image may be divided into n*m regions, and a region where the user's LOS is located may be determined in the display image. When several images are displayed at the display interface of the terminal device, the display image at the position of the user's LOS may be determined by the wearable device.

Step 303: acquiring, by the wearable device, action information of the user's eyeball.

To be specific, the action information of the user's eyeball may be acquired by the image collector of the wearable device, and the action information of the user's eyeball includes, but not limited to, where or not the user's LOS remains at an identical region for a period of time exceeding a predetermined time, a blinking action of the user, pupil contraction, pupil dilation and a squinting action. When a boundary image of the iris of the user's eyeball cannot be collected by the image collector, it is determined that the user has closed his eyes, and when an area of the iris of the user's eyeball collected by the image color is reduced, it is determined that the user is squinting.

Step 304: identifying, by the wearable device, an action command corresponding to the action information of the user's eyeball.

To be specific, an action information database may be established in advance, and a correspondence between the action information of the user's eyeball and the action command is stored in the action information database. The action command corresponding to the acquired action information of the user's eyeball may be searched by the wearable device in the action information database. The action information database may be set by a manufacturer, or customized by the user. The action information database may be stored in the wearable device worn by the user.

Step 305: transmitting, by the wearable device, the identified action command and the position of the user's LOS to the terminal device, and performing, by the terminal device, a corresponding operation on a display image at position of the user's LOS in accordance with the identified action command.

To be specific, when the user's LOS remains at an identical region for a period of time exceeding the predetermined time, an image at this region is zoomed in by the terminal device, and after the user's LOS is moved away, the image at this region is recovered. During the blinking action, the image at the position of the user's LOS is cancelled; during the pupil contraction or the squinting action, brightness of the image at the user's LOS is reduced; and during the pupil dilation or a wide open of the eye, the brightness of the image at the user's LOS is increased.

For an existing terminal device for providing the display interface, usually the brightness is not modified automatically, let alone with judging a comfort level of the user to the brightness. According to the LOS processing method in this embodiment, it is able to adjust the brightness of the display image in accordance with the comfort level of the user to the brightness, thereby to improve the user experience. In addition, the wearable device may automatically acquire the action information of the user's eyeball without any manual operations, and then the terminal device may automatically perform the corresponding operation on the display image at the position of the user's LOS in accordance with the acquired action information, so it is able to facilitate the user's operation.

Fourth Embodiment

Figure 4:
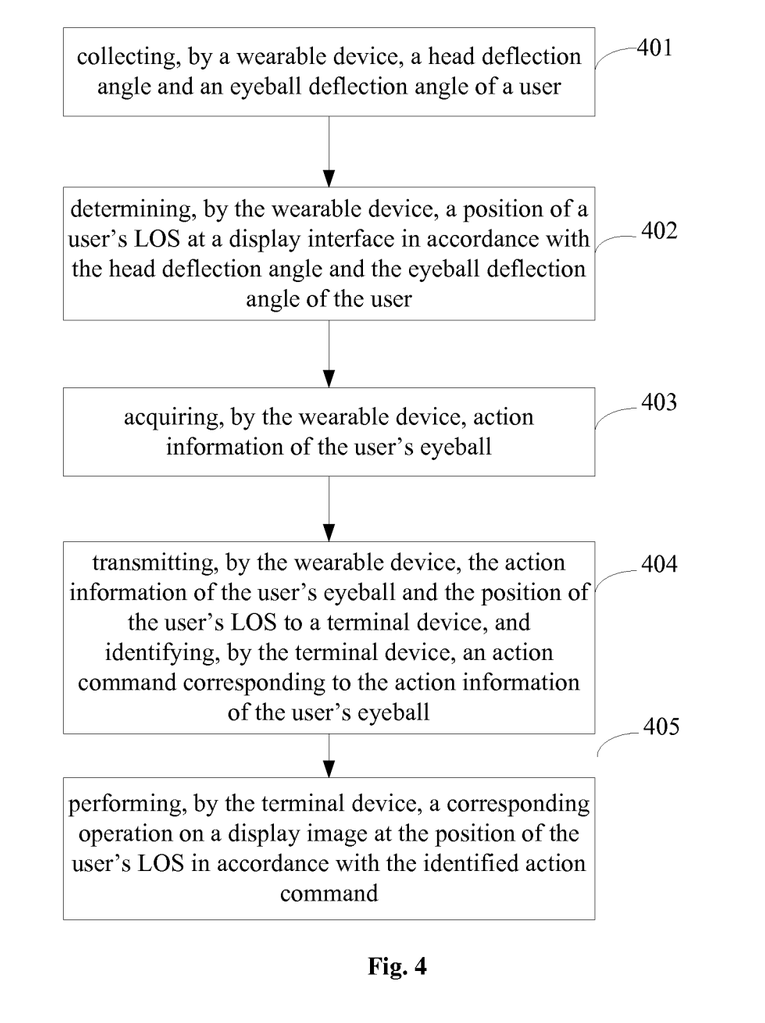
FIG. 4 is still yet another flow chart of the LOS processing method according to the fourth embodiment of the present disclosure.

In this embodiment, the wearable device may be used to detect the position of the user's LOS, acquire the action information of the user's eyeball, and transmit the acquired action information of the user's eyeball and the position of the user's LOS to the terminal device. The terminal device maybe used to identify the action command corresponding to the action information of the user's eyeball. As shown in FIG. 4, which is still yet another flow chart of the LOS processing method according to the fourth embodiment of the present disclosure, the method includes the following steps.

Step 401: collecting, by the wearable device, a head deflection angle and an eyeball deflection angle of a user.

To be specific, the head deflection angle and the eyeball deflection angle of the user may be collected by the wearable device located at a user's head. The wearable device includes a microelectronic mechanical gyroscope and an image collector, and alternatively the wearable device is a hamlet or glasses. The head deflection angle of the user is detected by the microelectronic mechanical gyroscope so as to acquire the head deflection angle of the user. An image of a user's eyeball is collected by the image collector, e.g., a camera, and the collected image is grayed, so as to determine a junction between an iris and a sclera of the user's eyeball, thereby to calculate the eyeball deflection of the user. Specifically, an LOS reference point of the user may be set in advance, and when the user fixes his eyes on the LOS reference point, initial LOS data of the user is acquired. The initial LOS data includes an initial junction between the iris and the sclera of the user's eyeball. Then, the junction between the iris and the sclera of the user's eyeball is compared with the initial junction, so as to calculate the eyeball deflection angle of the user.

Further, when the image is collected by the image collector, an infrared lighting module may be used to supplement light for the image collector, so as to ensure an identification rate in a dark state.

Step 402: determining, by the wearable device, a position of a user's LOS at a display interface in accordance with the head deflection angle and the eyeball deflection angle of the user.

To be specific, merely one image is displayed at the display interface of a terminal device, the display image may be divided into n*m regions, and a region where the user's LOS is located may be determined in the display image. When several images are displayed at the display interface of the terminal device, the display image at the position of the user's LOS may be determined by the wearable device.

Step 403: acquiring, by the wearable device, action information of the user's eyeball.

To be specific, the action information of the user's eyeball may be acquired by the image collector of the wearable device, and the action information of the user's eyeball includes, but not limited to, where or not the user's LOS remains at an identical region for a period of time exceeding a predetermined time, a blinking action of the user, pupil contraction, pupil dilation and a squinting action. When a boundary image of the iris of the user's eyeball cannot be collected by the image collector, it is determined that the user has closed his eyes, and when an area of the iris of the user's eyeball collected by the image color is reduced, it is determined that the user is squinting.

Step 404: transmitting, by the wearable device, the action information of the user's eyeball and the position of the user's LOS to the terminal device, and identifying, by the terminal device, an action command corresponding to the action information of the user's eyeball.

To be specific, an action information database may be established in advance, and a correspondence between the action information of the user's eyeball and the action command is stored in the action information database. The action command corresponding to the acquired action information of the user's eyeball may be searched by the terminal device in the action information database. The action information database may be set by a manufacturer, or customized by the user. The action information database may be stored in the terminal device for displaying an image to the user.

Step 405: performing, by the terminal device, a corresponding operation on a display image at the position of the user's LOS in accordance with the identified action command.

To be specific, when the user's LOS remains at an identical region for a period of time exceeding the predetermined time, an image at this region is zoomed in by the terminal device, and after the user's LOS is moved away, the image at this region is recovered. During the blinking action, the image at the position of the user's LOS is cancelled; during the pupil contraction or the squinting action, brightness of the image at the user's LOS is reduced; and during the pupil dilation or a wide open of the eye, the brightness of the image at the user's LOS is increased.

For an existing terminal device for providing the display interface, usually the brightness is not modified automatically, let alone with judging a comfort level of the user to the brightness. According to the LOS processing method in this embodiment, it is able to adjust the brightness of the display image in accordance with the comfort level of the user to the brightness, thereby to improve the user experience. In addition, the wearable device may automatically acquire the action information of the user's eyeball without any manual operations, and then the terminal device may automatically perform the corresponding operation on the display image at the position of the user's LOS in accordance with the acquired action information, so it is able to facilitate the user's operation.

Fifth Embodiment

Figure 5:
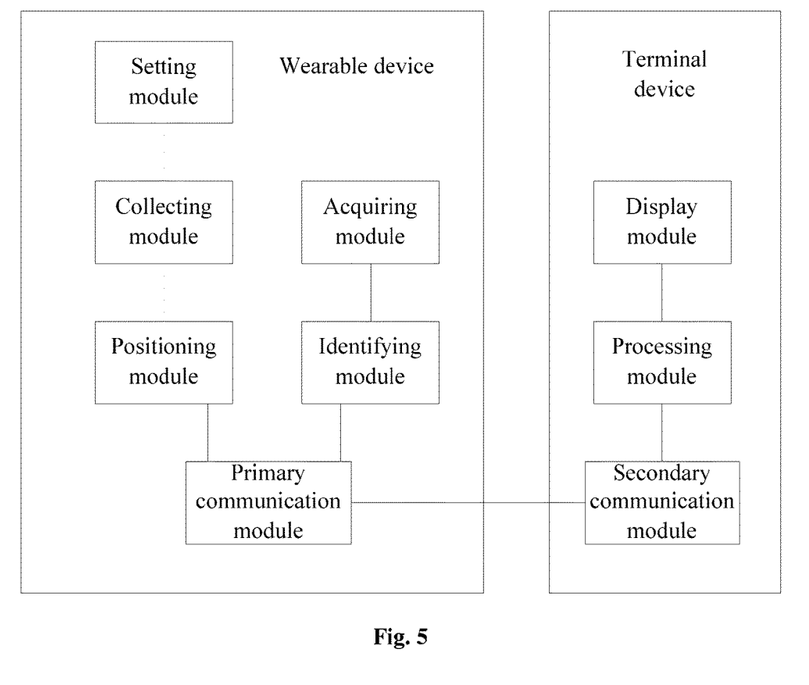
FIG. 5 is a schematic view showing an LOS processing system according to the fifth embodiment of the present disclosure.

As shown in FIG. 5, the present disclosure provides in this embodiment an LOS processing system, which includes:

a collecting module configured to collect a head deflection angle and an eyeball deflection angle of a user; and a positioning module configured to determine a position of a user's LOS at a display interface in accordance with the head deflection angle and the eyeball deflection angle of the user.

Further, the collecting module includes:

a first collecting unit configured to detect the head deflection angle of the user using a microelectronic mechanical gyroscope located at a user's head, so as to acquire the head deflection angle of the user; and a second collecting unit configured to collect an image of a user's eyeball using an image collector, so as to determine a junction between an iris and a sclera of the user's eyeball, thereby to calculate the eyeball deflection angle of the user.

Further, the system includes a setting module configured to set an LOS reference point of the user, and when the user fixes his eyes on the LOS reference point, acquiring initial LOS data of the user.

Further, the initial LOS data includes an initial junction between the iris and the sclera of the user's eyeball, and the second collecting unit is configured to compare the junction between the iris and the sclera of the user's eyeball with the initial junction, so as to calculate the eyeball deflection angle of the user.

Further, the system includes:

an acquiring module configured to acquire action information of the user's eyeball;

an identifying module configured to identify an action command corresponding to the action information of the user's eyeball; and a processing module configured to perform a corresponding operation on a display image at the position of the user's LOS in accordance with the identified action command.

As shown in FIG. 5, the collecting module, the positioning module, the acquiring module and the identifying module are arranged in a wearable device, and the processing module is arranged in a terminal device. The wearable device further includes a primary communication module, and the terminal device further includes a secondary communication module and a display module. The primary communication module is configured to transmit the identified action command and the position of the user's LOS to the secondary communication module. The secondary communication module is configured to receive the identified action command and the position of the user's LOS from the primary communication module. The display module is configured to provide the display interface.

Further, the system includes an infrared lighting module configured to supplement light for the image collector.

Sixth Embodiment

Figure 6:
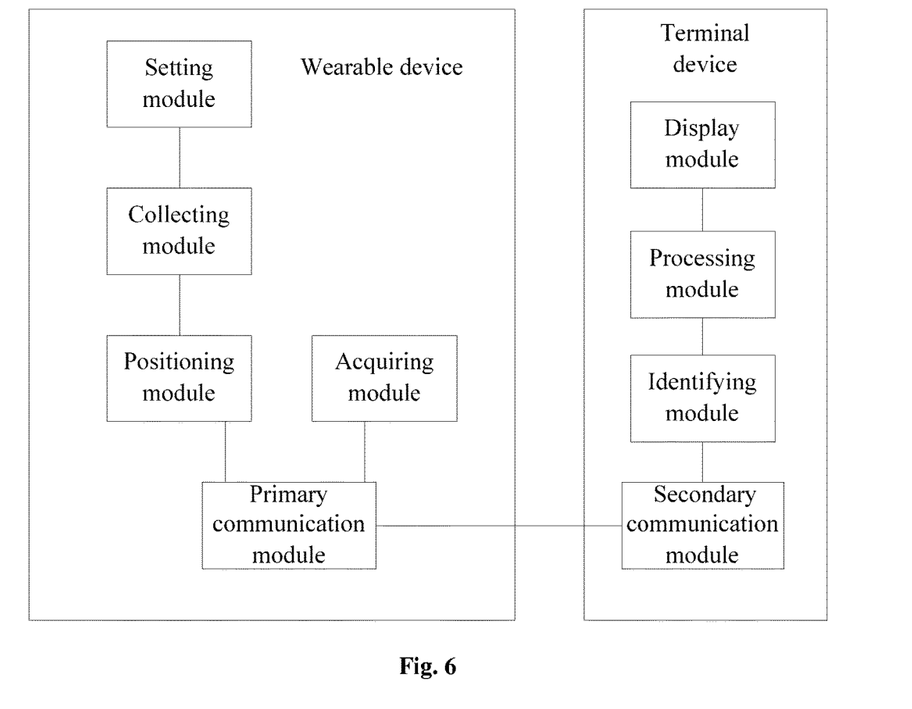
FIG. 6 is another schematic view showing the LOS processing system according to the sixth embodiment of the present disclosure.

As shown in FIG. 6, the present disclosure provides in this embodiment an LOS processing system, which includes:

a collecting module configured to collect a head deflection angle and an eyeball deflection angle of a user; and a positioning module configured to determine a position of a user's LOS at a display interface in accordance with the head deflection angle and the eyeball deflection angle of the user.

Further, the collecting module includes:

a first collecting unit configured to detect the head deflection angle of the user using a microelectronic mechanical gyroscope located at a user's head, so as to acquire the head deflection angle of the user; and a second collecting unit configured to collect an image of a user's eyeball using an image collector, so as to determine a junction between an iris and a sclera of the user's eyeball, thereby to calculate the eyeball deflection angle of the user.

Further, the system includes a setting module configured to set an LOS reference point of the user, and when the user fixes his eyes on the LOS reference point, acquiring initial LOS data of the user.

Further, the initial LOS data includes an initial junction between the iris and the sclera of the user's eyeball, and the second collecting unit is configured to compare the junction between the iris and the sclera of the user's eyeball with the initial junction, so as to calculate the eyeball deflection angle of the user.

Further, the system includes:

an acquiring module configured to acquire action information of the user's eyeball;

an identifying module configured to identify an action command corresponding to the action information of the user's eyeball; and a processing module configured to perform a corresponding operation on a display image at the position of the user's LOS in accordance with the identified action command.

As shown in FIG. 6, the collecting module, the positioning module and the acquiring module are arranged in a wearable device, and the processing module and the identifying module are arranged in a terminal device. The wearable device further includes a primary communication module, and the terminal device further includes a secondary communication module and a display module. The primary communication module is configured to transmit the acquired action information of the user's eyeball and the position of the user's LOS to the secondary communication module. The secondary communication module is configured to receive the identified action information of the user's eyeball and the position of the user's LOS from the primary communication module. The display module is configured to provide the display interface.

Further, the system includes an infrared lighting module configured to supplement light for the image collector.

Seventh Embodiment

Figure 7:
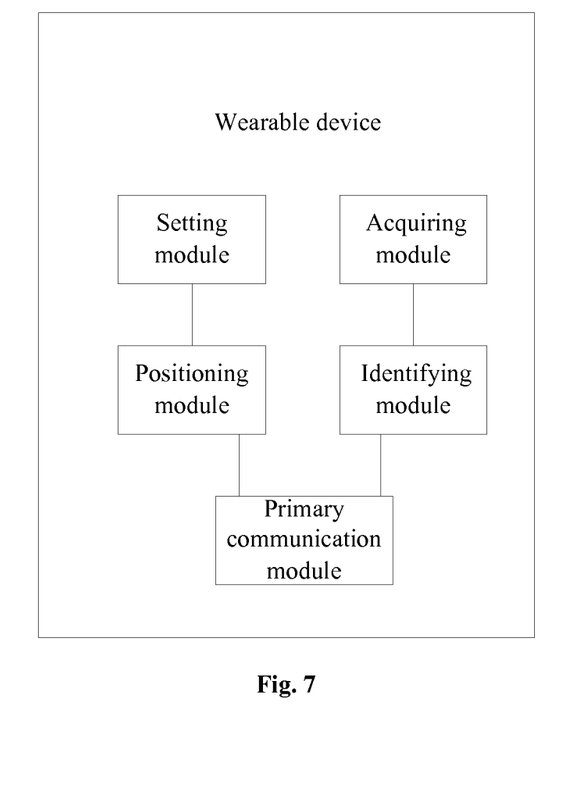
FIG. 7 is a schematic view showing a wearable device according to the seventh embodiment of the present disclosure.

As shown in FIG. 7, the present disclosure provides in this embodiment a wearable device, which includes:

a collecting module configured to collect a head deflection angle and an eyeball deflection angle of a user; and a positioning module configured to determine a position of a user's LOS at a display interface in accordance with the head deflection angle and the eyeball deflection angle of the user.

Further, the wearable device includes:

an acquiring module configured to acquire action information of the user's eyeball;

an identifying module configured to identify an action command corresponding to the action information of the user's eyeball; and a primary communication module configured to transmit the identified action command and the position of the user's LOS to a terminal device.

Eighth Embodiment

Figure 8:
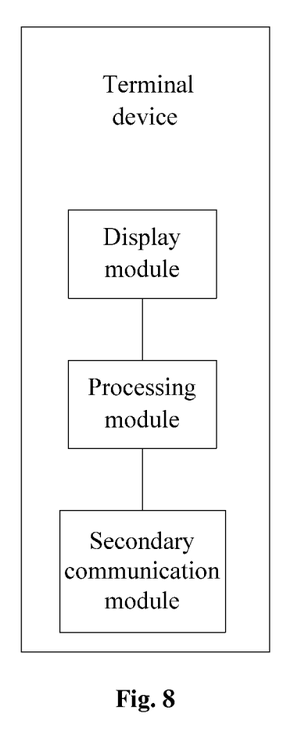
FIG. 8 is a schematic view showing a terminal device according to the eighth embodiment of the present disclosure.

As shown in FIG. 8, the present disclosure provides in this embodiment a terminal device, which includes:

a display module configured to provide a display interface;

a secondary communication module configured to receive an action command and a position of a user's LOS from a wearable device worn by a user; and a processing module configured to perform a corresponding operation on a display image at the position of the user's LOS in accordance with the identified action command.

The functional members described in the specification are referred to as modules, so as to emphasize the independence of the implementation in a more particular manner.

According to the embodiments of the present invention, the modules may be implemented by software, so as to be executed by various processors. For example, an identified, executable code module may comprise one or more physical or logical blocks including computer instructions, and the module can be constructed as an image, a process or a function. Even so, the executable codes of the identified modules are unnecessary to be physically located together, but may comprise different instructions stored in different locations. When these instructions are logically combined together, they form the modules and achieve the prescribed purposes of the modules.

Actually, the executable code module may be a single instruction or a plurality of instructions, and can even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit comprises a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

In the embodiments of the present invention, the order of the steps is not limited to the serial numbers thereof. For a person skilled in the art, any change in the order of the steps shall also fall within the scope of the present invention if without any creative effort.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A line-of-sight (LOS) processing method, comprising:
    a setting step of setting an LOS reference point of a user, and when the user fixes the user's eyes on the LOS reference point, acquiring initial LOS data of the user, wherein the initial LOS data comprises an initial junction between an iris and a sclera of the user's eyeball;
    a collecting step of collecting a head deflection angle and an eyeball deflection angle of the user, wherein detecting the head deflection angle of the user includes using a microelectronic mechanical gyroscope located at the user's head, so as to acquire the head deflection angle of the user, and collecting an image of the user's eyeball using an image collector, so as to determine a junction between the iris and the sclera of the user's eyeball, thereby to calculate the eyeball deflection angle of the user;
    a positioning step of determining a position of the user's LOS at a display interface in accordance with the head deflection angle and the eyeball deflection angle of the user;
    an acquiring step of acquiring action information of the user's eyeball, wherein the action information of the user's eyeball includes, where or not the user's LOS remains at an identical region for a period of time exceeding a predetermined time, a blinking action of the user, pupil contraction, pupil dilation and a squinting action;
    an identifying step of identifying an action command corresponding to the action information of the user's eyeball; and
    a processing step of performing a corresponding operation on a display image at the position of the user's LOS in accordance with the identified action command, wherein when the user's LOS remains at an identical region for a period of time exceeding the predetermined time, an image at the region is zoomed in, and after the user's LOS is moved away, the image at the region is recovered; during the blinking action, the image at the position of the user's LOS is cancelled; during the pupil contraction or the squinting action, brightness of the image at the user's LOS is reduced; and during the pupil dilation, the brightness of the image at the user's LOS is increased.

2. The LOS processing method according to claim 1, wherein the collecting step further comprises:
when the image is collected by the image collector, supplementing light for the image collector using an infrared lighting circuit.

3. The LOS processing method according to claim 1, wherein the collecting step, the positioning step, the acquiring step and the identifying step are performed by a wearable device, and the processing step is performed by a terminal device,
wherein between the identifying step and the processing step, the method further comprises:
transmitting, by the wearable device, the identified action command and the position of the user's LOS to the terminal device.

4. A line-of-sight (LOS) processing system, comprising:
a setting circuit, configured to set an LOS reference point of a user, and when the user fixes the user's eyes on the LOS reference point, acquiring initial LOS data of the user;
a collecting circuit, configured to collect a head deflection angle and an eyeball deflection angle of the user, wherein the collecting circuit comprises:
a first collecting circuit, configured to detect the head deflection angle of the user using a microelectronic mechanical gyroscope located at the user's head, so as to acquire the head deflection angle of the user; and
a second collecting circuit, configured to collect an image of the user's eyeball using an image collector, so as to determine a junction between an iris and a sclera of the user's eyeball, thereby to calculate the eyeball deflection angle of the user;
a positioning circuit, configured to determine a position of the user's LOS at a display interface in accordance with the head deflection angle and the eyeball deflection angle of the user;
an acquiring circuit, configured to acquire action information of the user's eyeball, wherein the action information of the user's eyeball includes, where or not the user's LOS remains at an identical region for a period of time exceeding a predetermined time, a blinking action of the user, pupil contraction, pupil dilation and a squinting action;
an identifying circuit, configured to identify an action command corresponding to the action information of the user's eyeball; and
a processing circuit, configured to perform a corresponding operation on a display image at the position of the user's LOS in accordance with the identified action command, wherein when the user's LOS remains at an identical region for a period of time exceeding the predetermined time, an image at the region is zoomed in by the processing circuit, and after the user's LOS is moved away, the image at the region is recovered by the processing circuit; during the blinking action, the image at the position of the user's LOS is cancelled by the processing circuit; during the pupil contraction or the squinting action, brightness of the image at the user's LOS is reduced by the processing circuit; and during the pupil dilation, the brightness of the image at the user's LOS is increased by the processing circuit.

5. The LOS processing system according to claim 4, wherein
the collecting circuit, the positioning circuit, the acquiring circuit and the identifying circuit are arranged in a wearable device, and the processing circuit is arranged in a terminal device;
the wearable device further comprises a primary communication circuit;
the terminal device further comprises a secondary communication circuit and a display circuit;
the primary communication circuit is configured to transmit the identified action command and the position of the user's LOS to the secondary communication circuit;
the secondary communication circuit is configured to receive the identified action command and the position of the user's LOS from the primary communication circuit; and
the display circuit is configured to provide the display interface.

6. The LOS processing system according to claim 4, further comprising:
an infrared lighting circuit configured to supplement light for the image collector.

7. A wearable device, comprising:
a setting circuit, configured to set an LOS reference point of a user, and when the user fixes the user's eyes on the LOS reference point, acquiring initial LOS data of the user;
a collecting circuit, configured to collect a head deflection angle and an eyeball deflection angle of a user, wherein the collecting circuit comprises:
a first collecting circuit, configured to detect the head deflection angle of the user using a microelectronic mechanical gyroscope located at the user's head, so as to acquire the head deflection angle of the user;
a second collecting circuit, configured to collect an image of the user's eyeball using an image collector, so as to determine a junction between an iris and a sclera of the user's eyeball, thereby to calculate the eyeball deflection angle of the user;
a positioning circuit, configured to determine a position of the user's LOS at a display interface in accordance with the head deflection angle and the eyeball deflection angle of the user;
an acquiring circuit, configured to acquire action information of the user's eyeball, wherein the action information of the user's eyeball includes, where or not the user's LOS remains at an identical region for a period of time exceeding a predetermined time, a blinking action of the user, pupil contraction, pupil dilation and a squinting action;
an identifying circuit, configured to identify an action command corresponding to the action information of the user's eyeball; and
a processing circuit, configured to perform a corresponding operation on a display image at the position of the user's LOS in accordance with the identified action command, wherein when the user's LOS remains at an identical region for a period of time exceeding the predetermined time, an image at the region is zoomed in by the processing circuit, and after the user's LOS is moved away, the image at the region is recovered by the processing circuit; during the blinking action, the image at the position of the user's LOS is cancelled by the processing circuit; during the pupil contraction or the squinting action, brightness of the image at the user's LOS is reduced by the processing circuit; and during the pupil dilation, the brightness of the image at the user's LOS is increased by the processing circuit.

8. The wearable device according to claim 7, further comprising:

a primary communication circuit, configured to transmit the identified action command and the position of the user's LOS to a terminal device.

\* \* \* \* \*